United States Patent
Dupont

(10) Patent No.: US 7,212,965 B2
(45) Date of Patent: May 1, 2007

(54) ROBUST PARAMETERS FOR NOISY SPEECH RECOGNITION

(75) Inventor: Stéphane Dupont, Saint Vaast (BE)

(73) Assignee: Faculte Polytechnique De Mons (BE)

( * ) Notice: Subject to any disclaimer, the term of this patent is extended or adjusted under 35 U.S.C. 154(b) by 827 days.

(21) Appl. No.: 10/275,451

(22) PCT Filed: Apr. 25, 2001

(86) PCT No.: PCT/BE01/00072

§ 371 (c)(1),
(2), (4) Date: Nov. 1, 2002

(87) PCT Pub. No.: WO01/84537

PCT Pub. Date: Nov. 8, 2001

(65) Prior Publication Data

US 2003/0182114 A1    Sep. 25, 2003

(30) Foreign Application Priority Data

May 4, 2000    (EP) ................................ 00870094

(51) Int. Cl.
*G10L 19/10*    (2006.01)
(52) U.S. Cl. .................. 704/220; 704/260; 704/233
(58) Field of Classification Search ............... 704/220, 704/226, 233, 260, 230
See application file for complete search history.

(56) References Cited

U.S. PATENT DOCUMENTS

| | | | |
|---|---|---|---|
| 5,185,848 A | | 2/1993 | Aritsuka et al. |
| 5,381,512 A | * | 1/1995 | Holton et al. ............ 704/200.1 |
| 5,806,025 A | * | 9/1998 | Vis et al. .................... 704/226 |
| 5,963,899 A | * | 10/1999 | Bayya et al. ............... 704/226 |
| 6,035,048 A | * | 3/2000 | Diethorn .................... 381/94.3 |
| 6,070,140 A | * | 5/2000 | Tran .......................... 704/275 |
| 6,173,258 B1 | * | 1/2001 | Menendez-Pidal et al. . 704/233 |
| 6,230,122 B1 | * | 5/2001 | Wu et al. .................... 704/226 |

(Continued)

OTHER PUBLICATIONS

Yuk, et al., "Environment-Independent Continuous Speech Recognition Using Neural Networks and Hidden Markov Models", CAIP Center, Rutgers University, 1996, pp. 3358-3361.

(Continued)

*Primary Examiner*—Richemond Dorvil
*Assistant Examiner*—Qi Han
(74) *Attorney, Agent, or Firm*—Knobbe Martens Olson & Bear, LLP

(57) ABSTRACT

A method of automatic processing of noise-affected speech captures and digitizes speech in the form of at least one digitised signal and extracts several time-based sequences or frames corresponding to the signal, by means of an extraction system. Each frame is decomposed by means of an analysis system into at least two different frequency bands so as to obtain at least two first vectors of representative parameters for each frame, one for each frequency band. The method converts, by means of converter systems, the first vectors of representative parameters into second vectors of parameters substantially insensitive to noise, wherein each converter system (50) is associated with one frequency band and converts the first vector of representative parameters associated with the same frequency band, and wherein a learning of the converter systems is achieved on the basis of a learning corpus which corresponds to a corpus of speech contaminated by noise.

12 Claims, 4 Drawing Sheets

U.S. PATENT DOCUMENTS 6,347,297 B1 * 2/2002 Asghar et al. .............. 704/243

OTHER PUBLICATIONS

Bourland, et al., "Sub-band-Based Speech Recognition", Faculté Polytechnique de Mons, 1997, pp. 1251-1254.

Tibrewala, et al., "Sub-Band Based Recognition of Noisy Speech", Oregon Graduate Institute of Science and Technology, 1997, pp. 1255-1258.

Amir Hussain, "Non-linear Sub-band Processing for Binaural Adaptive Speech-Enhancement", Artificial Neural Networks, Conference Publication No. 470, Sep. 1999, pp. 121-125.

Berouti, et al., *Enhancement of Speech Corrupted by Acoustic Noise*, in Proc. of ICASSP'79, pp. 208-211, Apr. 1979.

Lim, et al., *Enhancement and Bandwidth Compression of Noisy Speech*, Proceedings of the IEEE, 67(12):1586-1604, Dec. 1979.

Hynek Hermansky, *Perceptual linear predictive (PLP) analysis of speech*, the Journal of the Acoustical Society of America, 87(4):1738-1752, Apr. 1990.

Morii, et al., *Noise Robustness in Speaker Independent Speech Recognition*, in Proc. of the Intl. Conf. On Spoken Language Processing, pp. 1145-1148, Nov. 1990.

Keinosuke Fukunaga, *Introduction to Statistical Pattern Recognition*, Academic Press, pp. 440-507, 1990.

Helge B.D. Sorensen, *A Cepstral Noise Reduction Multi-Layer Neural Network*, Proc. of IEEE International Conference on Acoustics, Speech and Signal Processing vol. 2, pp. 933-936, 1991.

Varga, et al., *Simultaneous Recognition of Concurrent Speech Signals Using Hidden Markov Model Decomposition*, in Proc. of EUROSPEECH'91, pp. 1175-1178, Genova, Italy, 1991.

Hermansky, et al., *Recognition of Speech in Additive and Convolutional Noise Based on Rasta Spectral Processing*, in Proc. IEEE Intl. Conf. on Acoustics, Speech, and Signal Processing, pp. 83-86, 1993.

Leggetter, et al., *Maximum likelihood linear regression for speaker adaptation of continuous density hidden Markov models*, Computer Speech and Language, 9:171-185, 1995.

B.D. Ripley, *Pattern Recognition and Neural Networks*, Cambridge University Press, pp. 143-179, 354-388; 1996.

Simon Haykin, *Neural Networks, a Comprehensive Foundation*, pp. 362-370.

Fontaine, et al., *Non-linear Discriminant Analysis for Improved Speech Recognition*, in Proc. of EUROSPEECH'97, Rhodes, Greece, 1997.

Bourland, et al., *A New ASR Approach Based on Independent Processing and Recombination of Partial Frequency Bands*, in Proc. of Intl. Conf. On Spoken Language Processing, pp. 422-425, Philadelphia, Oct. 1996.

Viikki, et al., *A Recursive Feature Vector Normalization Approach for Robust Speech Recognition in Noise*, in Proc. of ICASSP'98, pp. 733-736, 1998.

* cited by examiner

ROBUST PARAMETERS FOR NOISY SPEECH RECOGNITION

FIELD OF THE INVENTION

The present invention relates to a method and to a system for automatic speech processing.

DESCRIPTION OF THE RELATED TECHNOLOGY

Automatic speech processing comprises all the methods which analyse or generate speech by software or hardware means. At the present time, the main application fields of speech-processing methods are:
(1) speech recognition, which allows machines to "understand" human speech, and more particularly to transcribe the text which has been spoken (ASR—"Automatic Speech Recognition" systems);
(2) recognition of the speaker, which permits to determine, within a group of persons, (or even to authenticate) a person who has spoken;
(3) language recognition (French, German, English, etc), which permits to determine the language used by a person;
(4) speech coding, which has the main aim of facilitating the transmission of a voice signal by reducing the memory size necessary for the storage of said voice signal and by reducing its binary digit rate;
(5) speech synthesis, which allows to generate a speech signal, for example starting from a text.

In present-day speech recognition systems, the first step consists of digitising the voice signal recorded by a microphone. Next, an analysis system calculates vectors of parameters representative of this digitised voice signal. These calculations are performed at regular intervals, typically every 10 milliseconds, by analysis of short time-based signal sequences, called frames, of about 30 milliseconds of digitised signal. The analysis of the voice signal will therefore lead to a sequence of vectors of representative parameters, with one vector of representative parameters per frame. These vectors of representative parameters are then compared with reference models. This comparison generally makes use of a statistical approach based on the principle of hidden Markov models (HMMs).

These models represent basic lexical units such as phonemes, diphones, syllables or others, and possibly permit to estimate probabilities or likelihoods for these basic lexical units. These models can be considered as bricks allowing the construction of words or phrases. A lexicon permits to define words on the basis of these bricks, and a syntax allows to define the arrangements of words capable of constituting phrases. The variables defining these models are generally estimated by training on the basis of a learning corpus consisting of recorded speech signals. It is also possible to use knowledge of phonetics or linguistics to facilitate the definition of the models and the estimating of their parameters.

Different sources of variability make the recognition task difficult, for example, voice differences from one person to the other, poor pronunciation, local accents, speech-recording conditions and ambient noise.

Hence, even if the use of conventional automatic speech recognition systems under well-controlled conditions generally gives satisfaction, the error rate of such systems, however, increases substantially in the presence of noise. This increase is all the greater the higher the noise level. Indeed, the presence of noise leads to distortions of the vectors of representative parameters. As these distortions are not present in the models, the performances of the system are degraded.

Numerous techniques have been developed in order to reduce the sensitivity of these systems to noise. These various techniques can be regrouped into five main families, depending on the principle which they use.

Among these techniques, a first family aims to perform a processing the purpose of which is to obtain either a substantially noise-free version of a noisy signal recorded by a microphone or several microphones, or to obtain a substantially noise-free (compensated) version of the representative parameters (J. A. Lim & A. V. Oppenheim, "Enhancement and bandwidth compression of noisy speech", Proceedings of the IEEE, 67(12):1586–1604, December 1979). One example of embodiment using this principle is described in the document EP-0 556 992. Although very useful, these techniques nevertheless exhibit the drawback of introducing distortions as regards the vectors of representative parameters, and are generally insufficient to allow recognition in different acoustic environments, and in particular in the case of high noise levels.

A second family of techniques relates to the obtaining of representative parameters which are intrinsically less sensitive to the noise than the parameters conventionally used in the majority of automatic speech-recognition systems (H. Hermansky, N. Morgan & H. G. Hirsch, "Recognition of speech in additive and concolutional noise based on rasta spectral processing", in Proc. IEEE Intl. Conf. on Acoustics, Speech, and Signal Processing, pages 83–86, 1993; O. Viiki, D. Bye & K. Laurila, "A recursive feature vector normalization approach for robust speech recognition in noise", in Proc. of ICASSP'98, pages 733–736, 1998). However, these techniques exhibit certain limits related to the hypotheses on which they are based.

A third family of techniques has also been proposed. These techniques, instead of trying to transform the representative parameters, are based on the transformation of the parameters of the models used in the voice-recognition systems so as to adapt them to the standard conditions of use (A. P. Varga & R. K. Moore, "Simultaneous recognition of current speech signals using hidden Markov model decomposition", in Proc. of EUROSPEECH'91, pages 1175–1178, Genova, Italy, 1991; C. J. Leggeter & P. C. Woodland, "Maximum likelihood linear regression for speaker adaptation", Computer Speech and Language, 9:171–185, 1995). These adaptation techniques are in fact rapid-learning techniques which present the drawback of being effective, only if the noise conditions vary slowly. Indeed, these techniques require several tens of seconds of noisy speech signal in order to adapt the parameters of the recognition models. If, after this adaptation, the noise conditions change again, the recognition system will no longer be capable of correctly associating the vectors of representative parameters of the voice signal and the models.

A fourth family of techniques consists in conducting an analysis which permits to obtain representative parameters of frequency bands (H. Bourlard & S. Dupont, "A new ASR approach based on independent processing and recombination of partial frequency bands" in Proc. of Intl. Conf. on Spoken Language Processing, pages 422–425, Philadelphia, October 1996). Models can then be developed for each of these bands; the bands together should ideally cover the entire useful frequency spectrum, in other words up to 4 or 8 kHz. The benefit of these techniques, which will be called "multi-band (techniques)" hereafter is their ability to minimise, in a subsequent decision phase, the significance of heavily noise-affected frequency bands. However, these techniques are hardly efficient when the noise covers a wide range of the useful frequency spectrum. Examples of methods belonging to this family are given in the documents of Tibrewala et al. ("Sub-band based recognition of noisy speech" IEEE International Conference on Acoustics, Speech, and Signal Processing (ICASSP), US, Los Alamitos, IEE Comp. Soc. Press, 21 Apr. 1997, pages 1255–1258) and of Bourlard et al. "Subband-based speech recognition", IEEE International Conference on Acoustics, Speech, and Signal Processing (ICASSP), US, Los Alamitos, IEE Comp. Soc. Press, 21 Apr. 1997, pages 1251–1254).

Finally, a fifth family of techniques consists in contaminating the whole or part of the learning corpus, by adding noise at several different noise levels, and in estimating the parameters of the models used in the ASR system on the basis of this noise-affected corpus (T. Morii & H. Hoshimi, "Noise robustness in speaker independent speech", in Proc. of the Intl. Conf. on Spoken Language Processing, pages 1145–1148, November 1990). Examples of embodiments using this principle are described in the document EP-A-0 881 625, the document U.S. Pat. No. 5,185,848, as well as in the document of Yuk et al. ("Environment-independent continuous speech recognition using neural networks and hidden Markov models", IEEE International Conference on Acoustics, Speech, and Signal Processing (ICASSP), US, New York, IEE, vol. Conf. 21, 7 May 1996, pages 3358–3361). In particular, the document of Yuk et al. proposes to use a network of artificial neurons with the purpose of transforming representative parameters, obtained by the analysis, into noise-free parameters mode or simply better adapted to the recognition system downstream. The parameters of this neuronal network are estimated on the basis of a reduced number of adaptation phrases (from 10 to 100 phrases in order to obtain good performance). The advantage of these techniques is that their performance is near optimal when the noise characterising the conditions of use is similar to the noise used to contaminate the learning corpus. On the other hand, when the two noises are different, the method is of little benefit. The scope of application of these techniques is therefore unfortunately limited, to the extent that it cannot be envisaged carrying out contamination on the basis of diversified noise which would cover all the noises likely to be encountered during use.

The document from Hussain A. ("Non-linear sub-band processing for binaural adaptive speech-enhancement" ICANN99. Ninth International Conference on Artificial Neuronal Networks (IEE Conf. Publ. No. 470), Edinburgh, UK, 7–10 Sep. 1999, pages 121–125, vol. 1) does not describe, as such, a speech-signal analysis method intended for voice recognition and/or for speech coding, but it describes a particular method of removing noise from speech, in order to obtain a noise-free time-based signal. More precisely, the method corresponds to a "multi-band" noise-removing approach, which consists of using a bank of filters producing time-based signals, said time-based signals subsequently being processed by linear or non-linear adaptive filters, that is to say filters adapting to the conditions of use. This method therefore operates on the speech signal itself, and not on vectors of representative parameters of this signal obtained by analysis. The non-linear filters used in this method are conventional artificial neuronal networks or networks using expansion functions. Recourse to adaptive filters exhibits several drawbacks. A first drawback is that the convergence of the algorithms for adapting artificial neuronal networks is slow in comparison to the modulation frequencies of certain ambient noise types, which renders them unreliable. Another drawback is that the adaptive approach, as mentioned in the document, requires a method of the "adapt-and-freeze" type, so as to adapt only during the portions of signal which are free from speech. This means making a distinction between the portions of signal with speech and the portions of signal without speech, which is difficult to implement with the currently available speech-detection algorithms, especially when the noise level is high.

SUMMARY OF CERTAIN INVENTIVE ASPECTS

The present invention aims to propose a method of automatic speech processing in which the error rate is substantially reduced as compared to the techniques of the state of the art.

More particularly, the present invention aims to provide a method allowing speech recognition in the presence of noise (sound coding and noise removal), whatever the nature of this noise, that is to say even if the noise features wide-band characteristics and/or even if these characteristics vary greatly in the course of time, for example if it is composed of noise containing essentially low frequencies followed by noise containing essentially high frequencies.

The present invention relates to a method of automatic processing of noise-affected speech comprising at least the following steps:

capture and digitising of the speech in the form of at least one digitised signal,
  extraction of several time-based sequences or frames, corresponding to said signal, by means of an extraction system,
  decomposition of each frame by means of an analysis system into at least two different frequency bands so as to obtain at least two first vectors of representative parameters for each frame, one for each frequency band, and
  conversion, by means of converter systems, of the first vectors of representative parameters into second vectors of parameters relatively insensitive to noise, each converter system being associated with one frequency band and converting the first vector of representative parameters associated with said same frequency band, and the learning of said converter systems being achieved on the basis of a learning corpus which corresponds to a corpus of speech contaminated by noise.

The decomposition step into frequency bands in the method according to the present invention is fundamental in order to ensure robustness when facing different types of noise.

Preferably, the method according to the present invention further comprises a step for concatenating the second vectors of representative parameters which are relatively insensitive to noise, associated with the different frequency bands of the same frame so as to have no more than one single third vector of concatenated parameters for each frame which is then used as input in an automatic speech-recognition system.

The conversion, by the use of converter systems, can be achieved by linear transformation or by non-linear transformation.

Preferably, the converter systems are artificial neuronal networks.

The use of artificial neuronal networks, trained on the basis of noisy speech data, features the advantage of not requiring an "adaptative" approach as described in the document of Hussain A. (op. cit. ) for adapting their parameters to the conditions of use.

Moreover, in contrast with the artificial neuronal networks used in the method described by Hussain A. (op. cit. ), the neuronal networks as used in the present invention operate on representative vectors obtained by analysis and not directly on the speech signal itself. This analysis has the advantage of greatly reducing the redundancy present in the speech signal and of allowing representation of the signal on the basis of vectors of representative parameters of relatively restricted dimensions.

Preferably, said artificial neuronal networks are of multi-layer perceptron type and each comprises at least one hidden layer.

Advantageously, the learning of said artificial neuronal networks of the multi-layer perceptron type relies on targets corresponding to basic lexical units for each frame of the learning corpus, the output vectors of the last hidden layer or layers of said artificial neuronal networks being used as vectors of representative parameters which are relatively insensitive to the noise.

The originality of the method of automatic speech processing according to the present invention lies in the combination of two principles, the "multi-band" decomposition and the contamination by noise, which are used separately in the state of the art and, as such, offer only limited benefit, while their combination of them gives to said method particular properties and performance which are clearly enhanced with respect to the currently available methods.

Conventionally, the techniques for contaminating the training data require a corpus correctly covering the majority of the noise situations which may arise in practice (this is called multi-style training), which is practically impossible to realise, given the diversity of the noise types. On the other hand, the method according to the invention is based on the use of a "multi-band" approach which justifies the contamination techniques.

The method according to the present invention is in fact based on the observation that, if a relatively narrow frequency band is considered, the noises will differ essentially only as to their level. Therefore, models associated with each of the frequency bands of the system can be trained after contamination of the learning corpus by any noise at different levels; these models will remain relatively insensitive to other types of noise. A subsequent decision step will then use said models, called "robust models", for automatic speech recognition.

The present invention also relates to an automatic speech-processing system comprising at least:
- an acquisition system for obtaining at least one digitised speech signal,
- an extraction system, for extracting several time-based sequences or frames corresponding to said signal,
- means for decomposing each frame into at least two different frequency bands in order to obtain at least two first vectors of representative parameters, one vector for each frequency band, and
- several converter systems, each converter system being associated with one frequency band for converting the first vector of representative parameters associated with this same frequency band into a second vector of parameters which are relatively insensitive to the noise, and the learning by the said converter systems being achieved on the basis of a corpus of noise-contaminated speech.

Preferably, the converter systems are artificial neuronal networks, preferably of the multi-layer perceptron type.

Preferably, the automatic speech-processing system according to the invention further comprises means allowing the concatenation of the second vectors of representative parameters which are relatively insensitive to the noise, associated with different frequency bands of the same frame in order to have no more than one single third vector of concatenated parameters for each frame, said third vector then being used as input in an automatic speech-recognition system.

It should be noted that, with the architecture of the analysis being similar for all the frequency bands, only the block diagram for one of the frequency bands is detailed here.

The automatic processing system and method according to the present invention can be used for speech recognition, for speech coding or for removing noise from speech.

DETAILED DESCRIPTION OF CERTAIN INVENTIVE EMBODIMENTS

Figure 1:
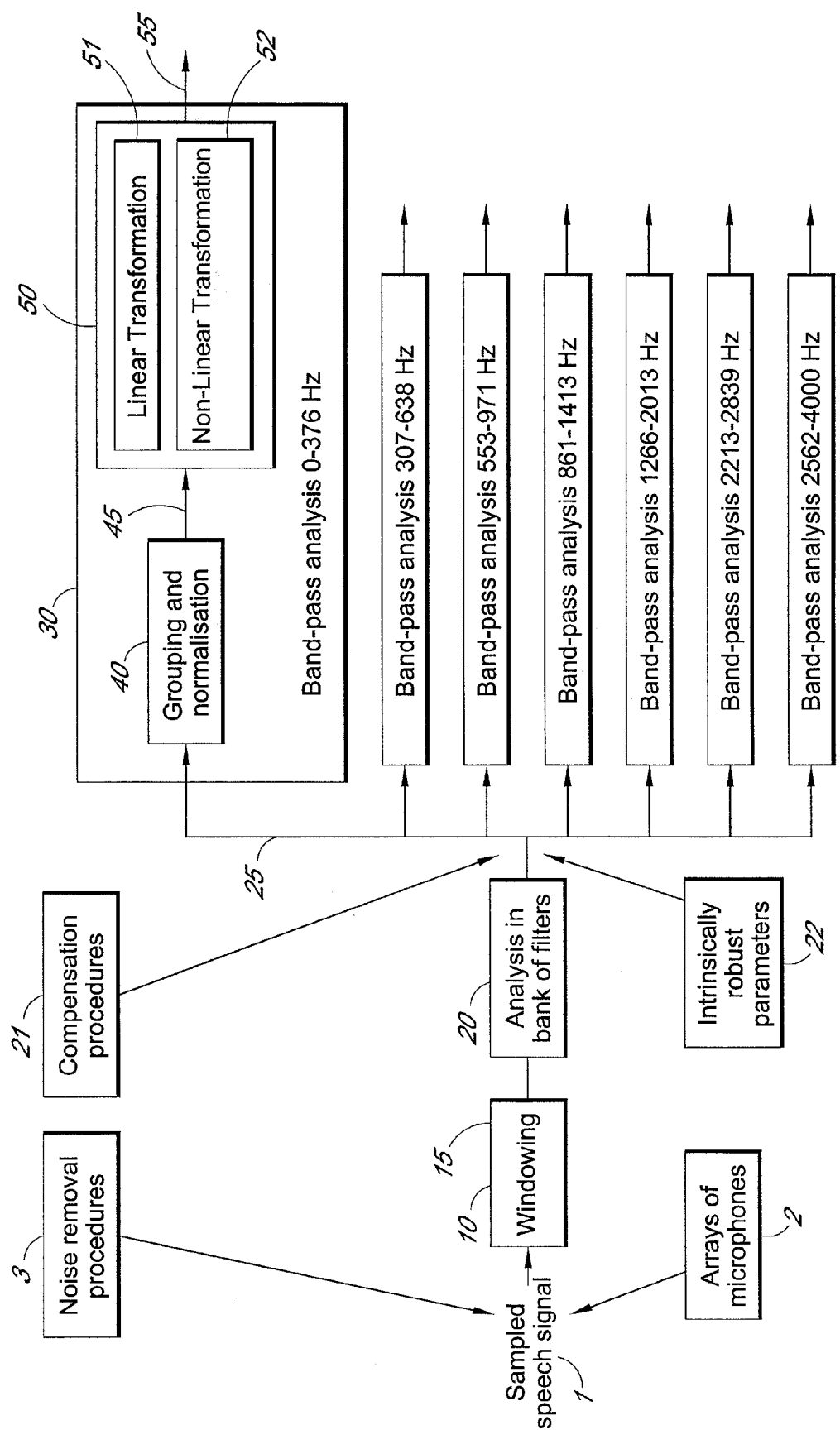
FIG. 1 presents a diagram of the first steps of automatic speech processing according to a preferred embodiment of the present invention, going from the acquisition of the speech signal up to the obtaining of the representative parameters which are relatively insensitive to the noise associated with each of the frequency bands.

According to one preferred embodiment of the invention, as FIG. 1 shows, the signal 1, sampled at a frequency of 8 kHz first passes through a windowing module 10 constituting an extraction system which divides the signal into a succession of time-based 15- to 30-ms frames (240 samples). Two successive frames overlap by 20 ms. The elements of each frame are weighted by a Hamming window.

Next, in a first digital-processing step, a critical-band analysis is performed on each sampled-signal frame by means of a module 20. This analysis is representative of the frequency resolution scale of the human ear. The approach used is inspired on the first analysis phase of the PLP technique (H. Hermansky, "Perpetual linear predictive (PLP) analysis speech", the Journal of the Acoustical Society of America, 87(4):1738–1752, April 1992). It operates in the frequency domain. The filters used are trapezoidal and the distance between the central frequencies follows a psychoacoustic frequency scale. The distance between the central frequencies of two successive filters is set at 0.5 Bark in this case, the Bark frequency (B) being able to be obtained by the expression:

$$B=6 \ln(f/600+\sqrt{(f/600)^2+1})$$

where (f) is the frequency in Hertz.

Other values could nevertheless be envisaged.

For a signal sampled at 8 kHz, this analysis leads to a vector 25 comprising the energies of 30 frequency bands. The procedure also includes an accentuation of the high frequencies.

This vector of 30 elements is then dissociated into seven sub-vectors of representative parameters of the spectral envelope in seven different frequency bands. The following decomposition is used: 1–4 (the filters indexed from 1 to 4 constitute the first frequency band), 5–8, 9–12, 13–16, 17–20, 21–24 and 25–30 (the frequencies covered by these seven bands are given in FIG. 1).

Each sub-vector is normalised by dividing the values of its elements by the sum of all the elements of the sub-vector, that is to say by an estimate of the energy of the signal in the frequency band in question. This normalisation confers upon the sub-vector insensitivity as regarding the energy level of the signal.

For each frequency band, the representative parameters finally consist of the normalised sub-vector corresponding to the band, as well as the estimate of the energy of the signal in this band.

For each of the seven frequency bands, the processing described above is performed by a module 40 which supplies a vector 45 of representative parameters of the band in question. The module 40 defines with the module 20 a system called analysis system.

The modules 10, 20 and 40 could be replaced by any other approach making it possible to obtain representative parameters of different frequency bands.

For each frequency band, the corresponding representative parameters are then used by a converter system 50 the purpose of which is to estimate a vector 55 of representative parameters which are relatively insensitive to the noise present in the sampled speech signal.

Figure 3:
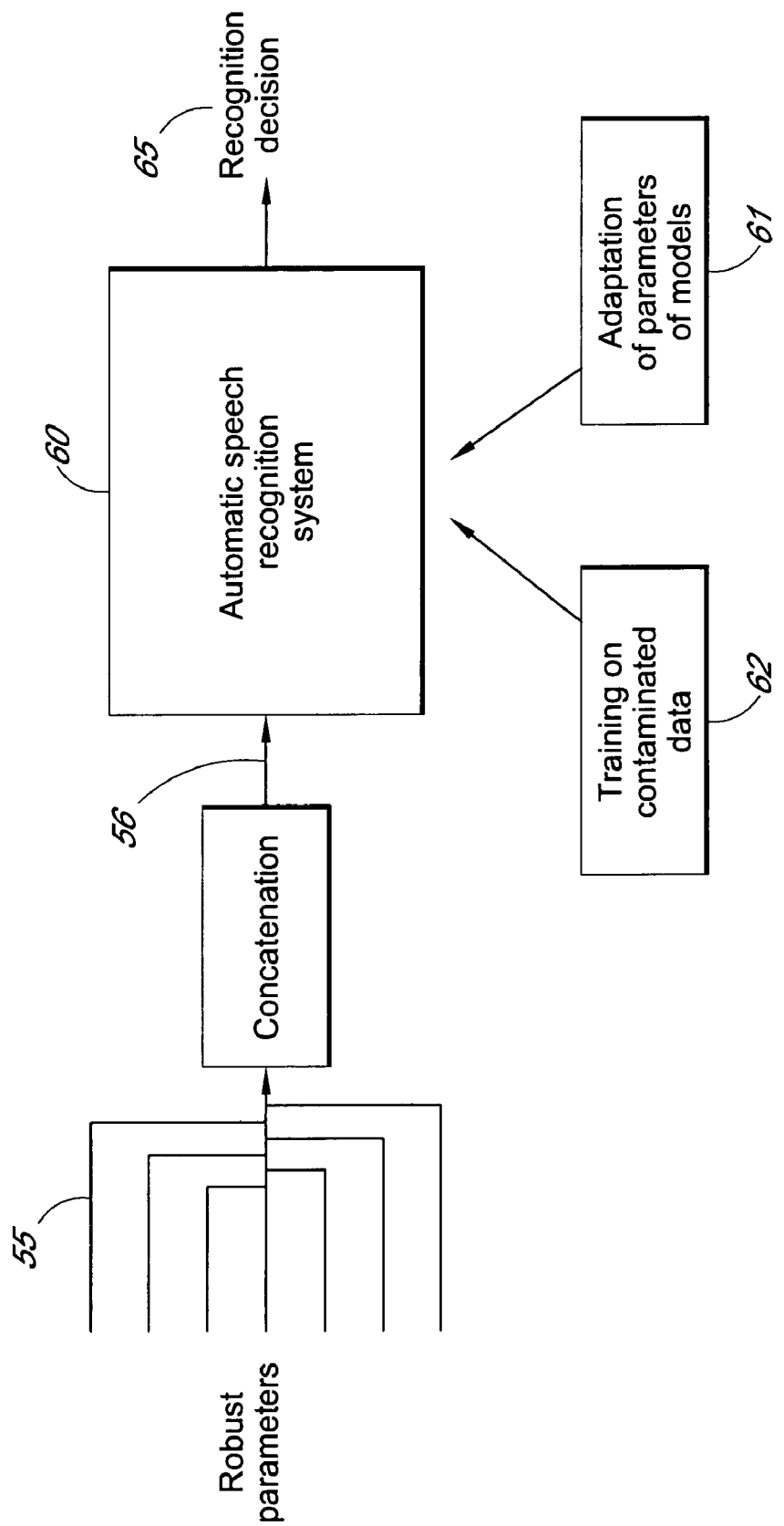
FIG. 3 presents a diagram of the automatic speech-processing steps which follow the steps of FIG. 1 according to one preferred embodiment of the present invention, for a speech-recognition application, and going from the concatenation of the noise-insensitive representative parameters associated with each of the frequency bands to the recognition decision.

As FIG. 3 shows, the vectors of representative parameters which are insensitive to the noise associated with each of the frequency bands are then concatenated in order to constitute a larger vector 56.

This large vector 56 is finally used as a vector of representative parameters of the frame in question. It could be used by the module 60 which corresponds to a speech-recognition system and of which the purpose is to supply the sequence of speech units which have been spoken.

In order to realize the desired functionality, an artificial neuronal network (ANN) (B. D. Ripley, "Pattern recognition and neuronal networks", Cambridge University Press, 1996) has been used as the implementation of the converter system 50. In general, the ANN calculates vectors of representative parameters according to an approach similar to the one of non-linear discriminant analysis (V. Fontaine, C. Ris & J. M. Boite, "Non-linear discriminant analysis for improved speech recognition", in Proc. of EUROSPEECH'97, Rhodes, Greece, 1997). Nevertheless, other linear-transformation 51 or non-linear-transformation 52 approaches, not necessarily involving an ANN, could equally be suitable for calculating the vectors of representative parameters, such as for example linear-discriminant-analysis techniques (Fukunaga, Introduction to Statistical Pattern Analysis, Academic Press, 1990), techniques of analysis in terms of principal components (I. T. Jolliffe, "Principal Component Analysis", Springer-Verlag, 1986) or regression techniques allowing the estimation of a noise-free version of the representative parameters (H. Sorensen, "A cepstral noise reduction multi-layer neuronal network", Proc. of the IEEE International Conference on Acoustics, Speech and Signal Processing, vol. 2, p. 933–936, 1991).

More precisely, the neuronal network used here is a multi-layer perceptron comprising two layers of hidden neurons. The non-linear functions of the neurons of this perceptron are sigmoids. The ANN comprises one output per basic lexical unit.

This artificial neuronal network is trained by the retro-propagation algorithm on the basis of a criterion of minimising the relative entropy. The training or learning is supervised and relies on targets corresponding to the basic lexical units of the presented training examples. More precisely, for each training or learning frame, the output of the desired ANN corresponding to the conventional basic lexical unit is set to 1, the other outputs being set to zero.

In the present case, the basic lexical units are phonemes. However, it is equally possible to use other types of units, such as allophones (phonemes in a particular phonetic context) or phonetic traits (nasalisation, frication).

Figure 2:
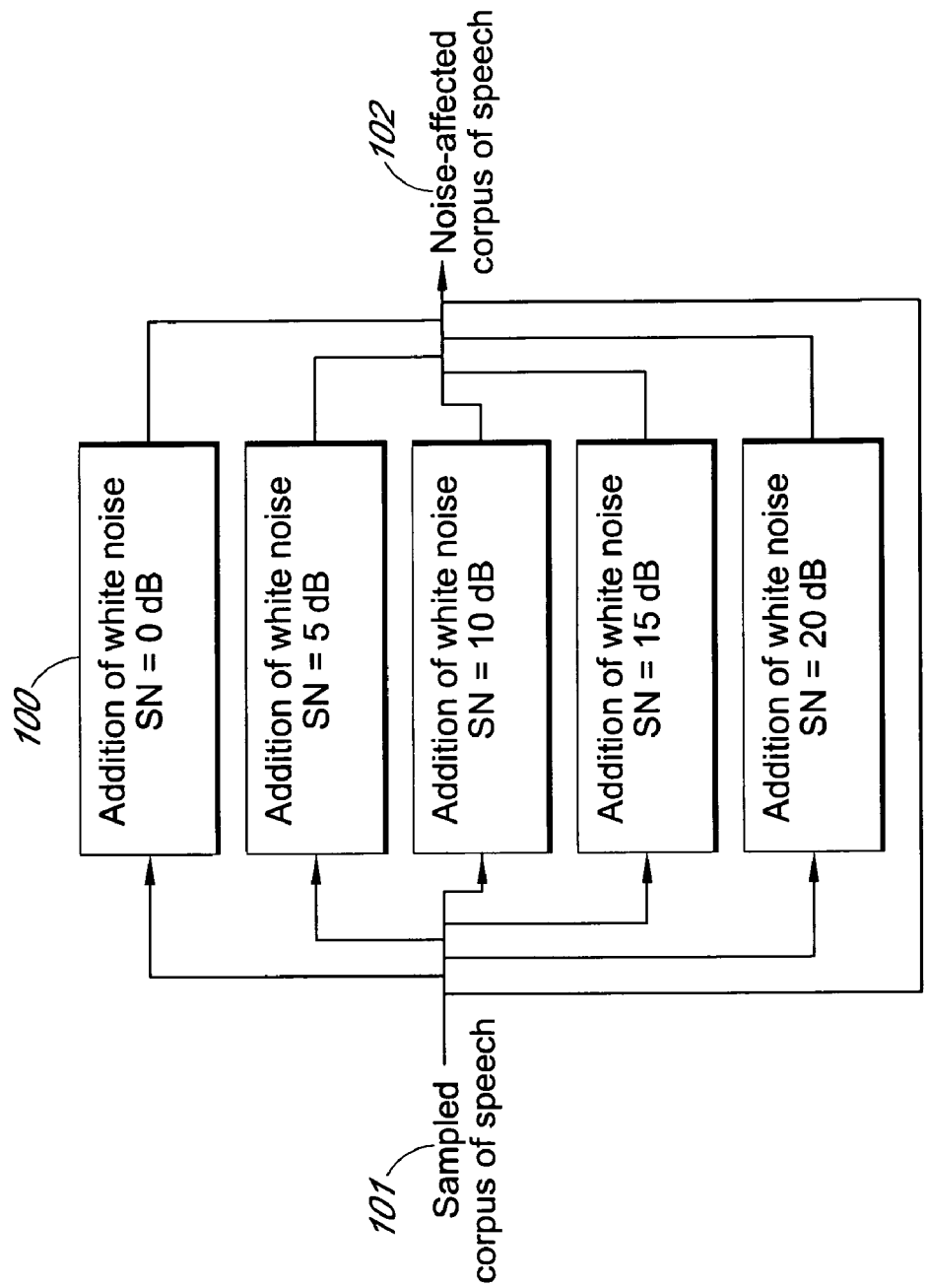
FIG. 2 presents the principle of contamination of the learning corpus by noise, according to one preferred embodiment of the present invention.

As illustrated in FIG. 2, the parameters of this ANN are estimated on the basis of a learning corpus 101 contaminated by noise 102 by means of module 100. So as to cover a majority of the noise levels likely to be encountered in practice, six versions of the learning corpus are used here.

One of the versions is used as it is, that is to say without added noise. The other versions have noise added by the use of the module 100 at different signal/noise ratios: 0 dB, 5 dB, 10 dB, 15 dB and 20 dB. These six versions are used to train the ANN. These training data are used at the input to the system presented in FIG. 1.

This system makes it possible to obtain representative parameters 45 of the various frequency bands envisaged. It is these parameters which feed the artificial neuronal networks and especially allow training by retro-propagation (B. D. Ripley, "Pattern recognition and neuronal networks", Cambridge University Press, 1996).

It should be noted that all the techniques which are generally employed when neuronal networks are used in speech processing can be applied here. Hence, it has been chosen here to apply, as input of the ANN, several, more precisely 9, vectors of representative parameters of successive signal frames, (so as to model the time-based correlation of the speech signal).

When an ANN is being used, an approach similar to that of the non-linear discriminant analysis is employed. The outputs of the second hidden layer, 30 in number, are used as parameters 55 which are insensitive to the noise for the associated frequency band.

As FIG. 3 shows, in a first application, the vectors of parameters associated with each of the seven frequency bands are then concatenated so as to lead to a vector 56 of 210 concatenated parameters.

At each signal frame, this vector is then used as input for an automatic speech-recognition system 60. This system is trained on the basis of representative parameters calculated by the technique described above (system illustrated in FIG. 1) on the basis of a corpus of speech (noise-affected or otherwise) in keeping with the desired recognition task.

It should be noted that the corpus of data allowing development of the systems 50 associated with each frequency band is not necessarily the same as that serving for the training of the voice-recognition system 60.

All types of robust techniques of the state of the art may play a part freely in the context of the system proposed here, as FIG. 1 illustrates.

Hence, robust acquisition techniques, especially those based on arrays of microphones 2, may be of use in obtaining a relatively noise-free speech signal.

Likewise, the noise-removal techniques such as spectral subtraction 3 (M. Berouti, R. Schwartz & J. Makhoul, "Enhancement of speech corrupted by acoustic noise", in Proc. of ICASSP'79, pages 208–211, April 1979) can be envisaged.

Any technique 22 for calculation of intrinsically robust parameters or any technique 21 for compensation of the representative parameters can likewise be used.

Thus, the modules 10, 20 and 40 can be replaced by any other-technique allowing to obtain representative parameters of different frequency bands.

The more insensitive these parameters are to ambient noise, the better the overall system will behave.

In the context of the application to voice recognition, as FIG. 2 shows, techniques 61 for adaptation of the models may likewise be used.

A procedure 62 for training the system on the basis of a corpus of speech contaminated by noise is likewise possible.

Figure 4:
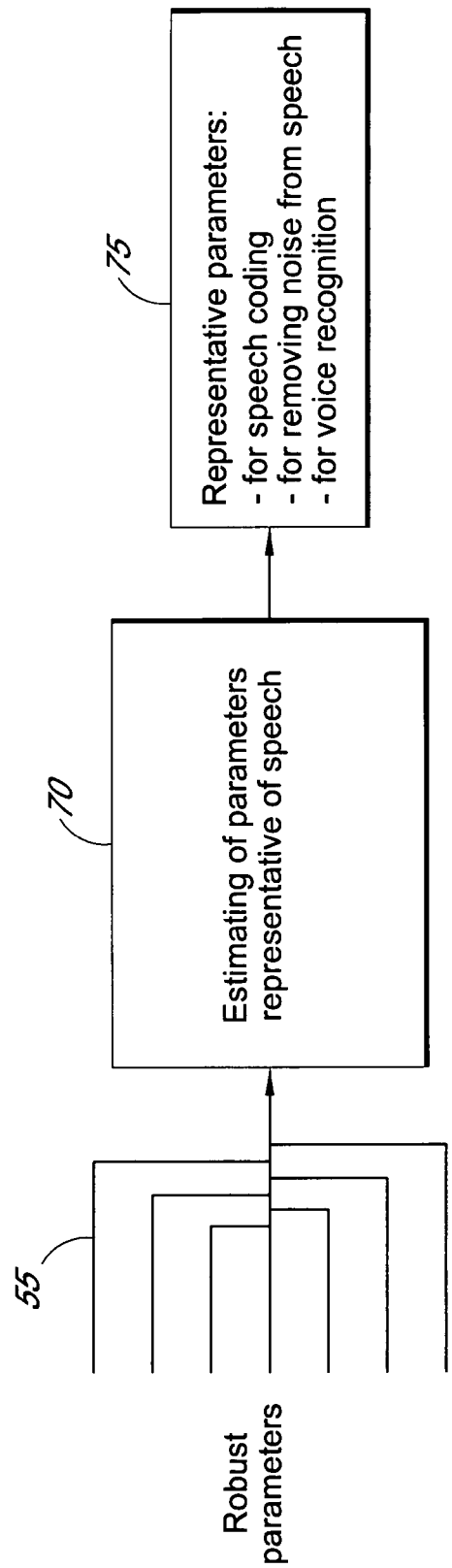
FIG. 4 presents the automatic speech-processing steps which follow the steps of FIG. 1 according to one preferred embodiment of the invention, and which are common to coding, noise-removal and speech-recognition applications.

In a second application, as FIG. 4 shows, the "robust" parameters 55 are used as input for a regression module 70 allowing estimating of conventional representative parameters 75 which can be used in the context of speech-processing techniques. For a speech-coding or noise-removal task, this system 70 could estimate the parameters of an autoregressive model of the speech signal. For a voice-recognition task, it is preferable to estimate cepstra, that is to say the values of the discrete Fourier transform which is the inverse of the logarithms of the discrete Fourier transform of the signal.

The regression model is optimised in the conventional way on the basis of a corpus of speech, noise-affected or otherwise.

The ideal outputs of the regression module are calculated on the basis of non-noise affected data.

All the operations described above are performed by software modules running on a single microprocessor. Furthermore, any other approach can be used freely.

It is possible, for example, to envisage a distributed processing in which the voice-recognition module 60 runs on a nearby or remote server to which the representative parameters 55 are supplied by way of a data-processing or telephony network.

What is claimed is:

1. A method of automatic processing of noise-affected speech, comprising:
   capturing and digitising noise-affected speech in form of at least one digitised signal;
   extracting several time-based sequences corresponding to said signal by means of an extraction system;
   decompositing each sequence by means of an analysis system into at least two different frequency bands so as to obtain at least two first vectors of representative parameters for each sequence, one vector for each frequency band; and
   converting, by means of converter systems, the first vectors of representative parameters into second vectors of parameters relatively insensitive to noise, each converter system being associated with one frequency band and converting the first vector of representative parameters associated with said same frequency band, wherein learning of said converter systems is achieved on the basis of a learning corpus which corresponds to a corpus of speech contaminated by noise.

2. The method according to claim 1, further comprising concatenating the second vectors of representative parameters which are relatively insensitive to noise, associated with different frequency bands of the same sequence so as to have no more than a single third vector of concatenated parameters for each sequence which is then used as input in an automatic speech-recognition system.

3. The method according to claim 1, wherein the conversion, by means of converter systems is achieved by one of a linear transformation and a non-linear transformation.

4. The method according to claim 1, wherein the converter systems are artificial neuronal networks.

5. The method according to claim 4, wherein said artificial neuronal networks are of the multi-layer perceptron type and each comprises at least one hidden layer.

6. The method according to claim 5, wherein the learning by the artificial neuronal networks of the multi-layer perceptron type relies on targets corresponding to basic lexical units for each sequence of the learning corpus, and wherein output vectors of a last hidden layer or layers of the artificial neuronal networks are used as vectors of representative parameters which are relatively insensitive to the noise.

7. The method according to claim 1, wherein the method is used for at least one of speech recognition, speech coding and removing noise from speech.

8. An automatic speech-processing system, comprising:
   an acquisition system for obtaining at least one digitised speech signal;
   an extraction system configured to extract several time-based sequences corresponding to said signal;
   a plurality of first modules configured to decompose each sequence into at least two different frequency bands so as to obtain at least two first vectors of representative parameters, one vector for each frequency band; and
   a plurality of converter systems, each converter system being associated with one frequency band and configured to convert the first vector of representative parameters associated with this same frequency band into a second vector of parameters which are substantially insensitive to noise, wherein a learning by the converter systems is achieved on the basis of a corpus of speech corrupted by noise.

9. The automatic speech-processing system according to claim 8, wherein the converter systems are artificial neuronal networks.

10. The automatic speech-processing system according to claim 9, wherein the artificial neuronal networks are of the multi-layer percetron type.

11. The automatic speech-processing system according to claim 8, further comprising second modules configured to concatenate the second vectors of representative parameters which are relatively insensitive to noise, associated with different frequency bands of the same sequence so as to have no more than a single third vector of concatenated parameters for each sequence, said third vector then being used as input into an automatic speech-recognition system.

12. The automatic speech-processing system according to claim 8, wherein the system is used for at least one of speech recognition, speech coding and removing noise from speech.

* * * * *

UNITED STATES PATENT AND TRADEMARK OFFICE
CERTIFICATE OF CORRECTION

PATENT NO. : 7,212,965 B2
APPLICATION NO. : 10/275451
DATED : May 1, 2007
INVENTOR(S) : Stephane Dupont It is certified that error appears in the above-identified patent and that said Letters Patent is hereby corrected as shown below:

| Column | Line | Description of Error |
|---|---|---|
| Page 2 Col. 1 (Other Publication) | 1 | Delete "Bourland," and insert -- Bourlard --, therefor. |
| 3 | 10 | After "et al." insert -- ( --. |
| 10 | 52 | In Claim 10, delete "percetron" and insert -- perceptron --, therefor. |

Signed and Sealed this

Twenty-fourth Day of November, 2009

David J. Kappos
*Director of the United States Patent and Trademark Office*